(12) United States Patent
Huang et al.

(10) Patent No.: US 11,220,436 B2
(45) Date of Patent: Jan. 11, 2022

(54) BASIC ZINC CHLORIDE PARTICULATE MATTER AND PREPARATION METHOD THEREFOR

(71) Applicant: GUANGZHOU COSMO ENVIRONMENTAL TECHNOLOGY CO., LTD., Guangdong (CN)

(72) Inventors: Zhiyuan Huang, Guangdong (CN); Yangdong Wu, Guangdong (CN); Chengwei Ye, Guangdong (CN); Hao Wang, Guangdong (CN); Zhengjiong Zha, Guangdong (CN); Yongcheng Wang, Guangdong (CN)

(73) Assignee: GUANGZHOU COSMO ENVIRONMENTAL TECHNOLOGY CO., LTD., Guangdong (CN)

( * ) Notice: Subject to any disclaimer, the term of this patent is extended or adjusted under 35 U.S.C. 154(b) by 9 days.

(21) Appl. No.: 16/767,587

(22) PCT Filed: Dec. 4, 2017

(86) PCT No.: PCT/CN2017/114481
§ 371 (c)(1),
(2) Date: May 27, 2020

(87) PCT Pub. No.: WO2019/104744
PCT Pub. Date: Jun. 6, 2019

(65) Prior Publication Data
US 2020/0385282 A1 Dec. 10, 2020

(30) Foreign Application Priority Data
Dec. 1, 2017 (CN) .......................... 201711252121.5

(51) Int. Cl.
*C01G 9/04* (2006.01)
*A23K 20/20* (2016.01)

(52) U.S. Cl.
CPC ................ *C01G 9/04* (2013.01); *A23K 20/30* (2016.05); *C01P 2004/03* (2013.01);
(Continued)

(58) Field of Classification Search
CPC .................................................. C01P 2004/51
See application file for complete search history.

(56) References Cited

FOREIGN PATENT DOCUMENTS

| CN | 102502783 | 6/2012 |
|---|---|---|
| CN | 102745737 | 10/2012 |

(Continued)

OTHER PUBLICATIONS

"International Search Report (Form PCT/ISA/210) of PCT/CN2017/114481", dated Jun. 13, 2018, with English translation thereof, pp. 1-5.

*Primary Examiner* — Alexandre F Ferre
(74) *Attorney, Agent, or Firm* — JCIP Global Inc.

(57) ABSTRACT

A basic zinc chloride particulate matter and a preparation method therefor. The basic zinc chloride particulate matter mainly consists of basic zinc chloride particles. In the basic zinc chloride particulate matter, $D_{10}>100$ μm, and $D_{95}>450$ μm. The basic zinc chloride particles do not contain adhesives. The basic zinc chloride particles contained in the basic zinc chloride particulate matter are approximately spherical, and the basic zinc chloride particles with the particle diameter>500 μm in the basic zinc chloride particulate matter accounts for 1% or less of the total mass of the basic zinc chloride particulate matter.

18 Claims, 5 Drawing Sheets

(52) U.S. Cl.
CPC ...... *C01P 2004/32* (2013.01); *C01P 2004/51* (2013.01); *C01P 2004/61* (2013.01)

(56) References Cited

FOREIGN PATENT DOCUMENTS

| | | |
|---|---|---|
| CN | 104108741 | 10/2014 |
| CN | 104276595 | 1/2015 |
| CN | 107324375 | 11/2017 |
| RO | 100384 | 11/1990 |

BASIC ZINC CHLORIDE PARTICULATE MATTER AND PREPARATION METHOD THEREFOR

CROSS-REFERENCE TO RELATED APPLICATION

This application is a 371 of international application of PCT application serial no. PCT/CN2017/114481, filed on Dec. 4, 2017, which claims the priority benefit of China application no. 201711252121.5, filed on Dec. 1, 2017. The entirety of each of the above mentioned patent applications is hereby incorporated by reference herein and made a part of this specification.

BACKGROUND

Technical Field

The present disclosure relates to the field of mineral feed additives, and specifically relates to a basic zinc chloride particulate matter and a preparation method therefor.

Description of Related Art

As a new-type mineral feed additive, and compared with the conventional mineral feed additives such as zinc sulfate and zinc oxide, basic zinc chloride possesses advantages of stable chemical structure, low dosage, high bioavailability and non-agglomeration, etc. The basic zinc chloride can be synthesized by numerous existing liquid-solid phase synthesis and liquid-liquid phase synthesis, but generally the following problems exist: raw materials are relatively expensive, the synthesized basic zinc chloride has a small size, large specific surface area, and poor filtration and washing performances, and becomes powder product after drying, resulting in a large amount of fugitive dust which makes the production environment adverse, and most of them are intermittent reaction production.

Increasing the particle size of the basic zinc chloride can effectively solve the problem of fugitive dust, and the prior art has been making effort to synthesize basic zinc chloride in large particles. For example, basic zinc chloride powder is subjected to re-granulation by using an adhesive to increase the particle size of the basic zinc chloride; or basic zinc chloride particles with relatively large particle size are synthesized in an organic acidic induced system, but the addition of organic inducer can increase difficulties of the subsequent wastewater treatment, and meanwhile, the basic zinc chloride particles prepared by such method has an irregular appearance, without good flowability.

Therefore, it is of great economic value and significance to develop a mineral feed additive, which is basic zinc chloride, with no fugitive dust, low production cost and no discharge of waste water, which can well solve the problems of large amount of fugitive dust in the working environment and difficulty of uniformly mixing a premix that exist in process of preparing the premix by using the basic zinc chloride by the existing feed enterprises.

SUMMARY

An objective of the present disclosure is to overcome the above-mentioned deficiencies of the prior art, and to provide a basic zinc chloride particulate matter. Basic zinc chloride particles that constitute the basic zinc chloride particulate matter has a relatively large particle size and good flowability, which can satisfy the requirements of no fugitive dust and easy flowing during the use process in the feed factory.

Another objective of the present disclosure is to provide a preparation method for the basic zinc chloride particulate matter.

The above objectives of the present disclosure are achieved by the following technical solutions. A further objective of the present invention is to provide a feed additive.

A basic zinc chloride particulate matter mainly consists of basic zinc chloride particles. The basic zinc chloride particulate matter has a D10 of more than 100 μm and a D95 of more than 450 μm. The basic zinc chloride particles are free of adhesives. Most of the basic zinc chloride particles contained in the basic zinc chloride particulate matter have a sphere-like appearance. The basic zinc chloride particles having a particle size of more than 500 μm in the basic zinc chloride particulate matter account for 1% or less of a total mass of the basic zinc chloride particulate matter.

Fugitive dust is easily caused by the existing basic zinc chloride, mainly for the reason that the size of the basic zinc chloride obtained by the conventional methods is too small. Basic zinc chloride particles with large size can be obtained by the method of twice granulation or organic inducer, but the process becomes more complicated, and it is difficult to control the effect and brings more inconvenience to the post-treatment. Moreover, addition of an adhesive results in decreased absolute content of zinc chloride. The basic zinc chloride particulate matter provided by the present disclosure is prepared by the provided method, wherein the basic zinc chloride has far larger size which is uniform simultaneously, and has excellent flowability, compared to those prepared by any existing methods.

In the basic zinc chloride particulate matter of the present disclosure, a mass content of the basic zinc chloride is 98% or more.

Preferably, the particles having a sphere-like appearance account for 95% or more of the total mass of the particulate matter, more preferably, 98% or more. The basic zinc chloride particulate matter having the above-mentioned features of the present disclosure has an angle of repose of 30° to 35°.

The basic zinc chloride particulate matter of the present disclosure generally has a particle size distribution range of 1 μm to 1000 μm. The particle size distribution varies within such range with the process conditions, that is, the minimum size of the particle size distribution may be more than 1 μm, while the maximum size of the particle size distribution may be less than 1000 μm. Therefore, if $D_{10}$ and $D_{95}$ of the products conform to the above-mentioned range, basic zinc chloride particulate matter with narrower particle size distribution can be obtained by the adjustment within the range of 1 μm to 1000 μm.

For example, in the present disclosure, basic zinc chloride product with narrower particle size distribution can also be obtained by manners such as sieving, etc. Preferably, a basic zinc chloride particulate matter mainly consists of basic zinc chloride particles. The basic zinc chloride particles in the basic zinc chloride particulate matter has a particle size distribution of 1 μm to 500 μm, and the basic zinc chloride particulate matter has a $D_{10}$ of more than 100 μm and a $D_{95}$ of more than 450 μm. The basic zinc chloride particles are free of adhesives. Most of the basic zinc chloride particles contained in the basic zinc chloride particulate matter have a sphere-like appearance.

The basic zinc chloride particles of the present disclosure are directly obtained by preparation of the basic zinc chloride, and thus the basic zinc chloride particles are free of adhesives.

A preparation method for the basic zinc chloride particulate matter, includes the following steps:

Step S1, preparing a zinc chloride solution having a zinc concentration of 60 g/L to 150 g/L;

Step S2, preparing an ammonia solution having a pH of 10 or more, adding ammonium chloride as an inducer into the ammonia solution to prepare a mixed solution, with the ammonium chloride serving as a main source of chloride ions in the mixed solution, so that the mixed solution has an ammonia-nitrogen concentration of 140 g/L to 170 g/L and a chloride ion concentration of 80 g/L to 160 g/L;

Step S3, complexing and ammonia-leaching of a zinc-containing raw material by using the mixed solution obtained in step S2 to prepare a zinc-ammonia complex solution, with a zinc concentration in the zinc-ammonia complex solution being 60 g/L to 150 g/L; and Step S4, adding water or a mother solution of the basic zinc chloride into a reaction vessel, heating to 70° C. to 90° C., and adding the zinc chloride solution in step S1 and the zinc-ammonia complex solution in step S3 simultaneously in a parallel feeding manner, maintaining a reaction pH value at 6.0 to 7.0, with a stirring speed of 1200 r/min to 1500 r/min, and reacting for 2 to 4 hours to obtain a precipitate and a zinc-containing mother solution, and washing and drying the precipitate to obtain the basic zinc chloride particulate matter.

It can be observed and found by scanning electron microscope that appearance of most of the basic zinc chloride particles prepared by the method of the present disclosure is nearly sphere-like, thus having better flowability. By using ammonium chloride as an inducer, no impurities are introduced additionally, so that wastewater treatment is simple. By controlling the parameters such as the reaction pH value and stirring speed, the basic zinc chloride product which is sphere-like and has large particle size is prepared, and the product has advantages of no-fugitive dust, good flowability, etc.

In order to obtain the basic zinc chloride particulate matter with narrower particle size distribution of the present disclosure, preferably the preparation method further comprises a step of sieving the dried precipitate after completing step S4 to remove the particles having relatively large particle size. Through sorting by a sieving device, the basic zinc chloride particulate matter with narrower particle size distribution range can be obtained.

Preferably, the sieving is to collect a particulate matter which can pass through a 35-mesh sieve.

Preferably, the zinc-containing mother solution in step S4 is subjected to alkali stripping and spraying absorption to recycle ammonia water.

Preferably, after removing the ammonia-nitrogen from the by alkali stripping, the zinc-containing mother solution in step S4 is subjected to depth removal of heavy metals, concentration and crystallization to recycle sodium chloride.

A feed additive includes the basic zinc chloride particulate matter.

Preferably, the zinc chloride solution in step S1 is prepared by the following method: using a zinc-containing flue dust as a raw material, leaching with acid, and removing impurities to obtain the zinc chloride solution. The flue dust is production waste of steel plants, and using the flue dust to prepare zinc chloride solution can realize the utilization of waste products which is economic and environmental.

Preferably, the zinc-containing raw material is a zinc-containing flue dust, and when using the zinc-containing flue dust as the raw material, the obtained zinc-ammonia complex solution is further subjected to a step of adding zinc powder for replacement and removal of impurities.

The zinc chloride solution in S1 can also be obtained by dissolving a zinc chloride solid or a zinc oxide solid into water or hydrochloric acid solution.

Main components of the wastewater which is generated during preparation of the basic zinc chloride by the present method is zinc-ammonia complex and ammonium chloride. Ammonia, zinc hydroxide and distilled water can be recycled by simply processing the wastewater, guaranteeing a closed cycle of zinc and ammonia-nitrogen, without discharge of wastewater during the whole technological process, and realizing a continuously environmental production.

Compared with the prior art, the present disclosure has the following beneficial effects.

The present disclosure provides a basic zinc chloride particulate matter and a preparation method therefor. The basic zinc chloride particulate matter has relatively large particle size and good flowability, which is easy to flow without fugitive dust when in use, solving the problems of large amount of fugitive dust in the working environment and difficulty of uniformly mixing a premix that exist in process of preparing the premix by using the basic zinc chloride by the existing feed enterprises. The preparation process of the present disclosure uses ammonium chloride as an inducer, no impurities are introduced additionally, and the production of wastewater can be recycled completely, with low production cost and environmental and economic production process.

DESCRIPTION OF THE EMBODIMENTS

Figure 1:
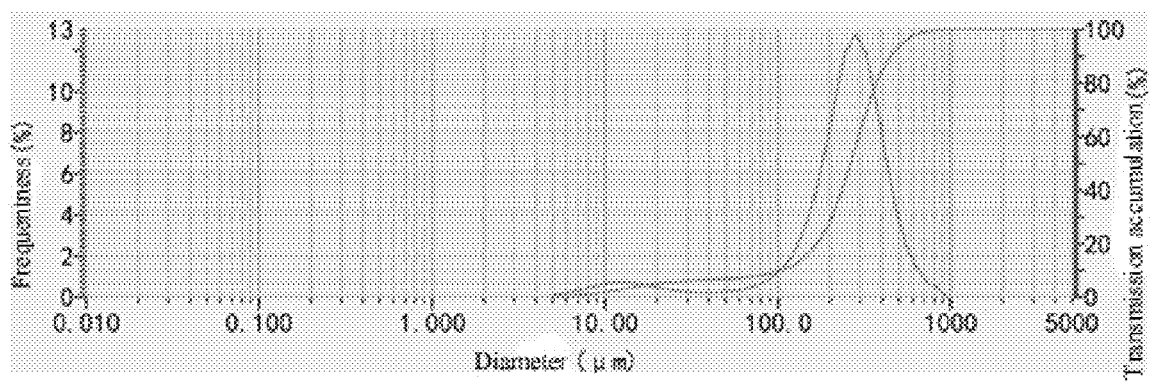
FIG. 1 is a particle size distribution diagram of a basic zinc chloride particulate matter prepared in Embodiment 1.
Figure 2:
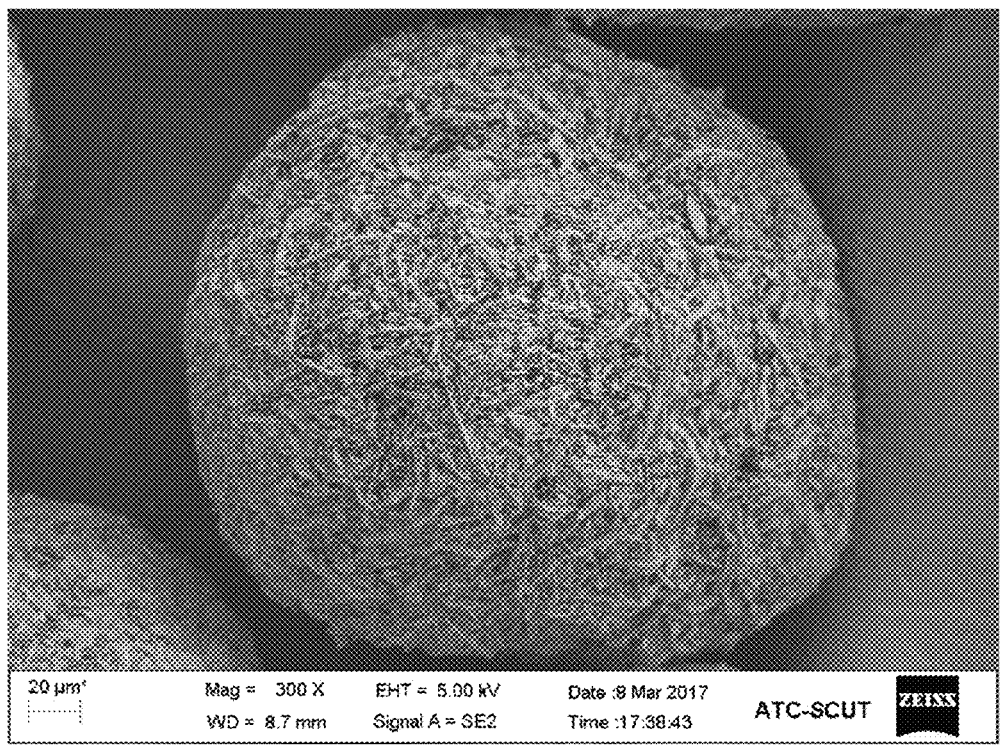
FIG. 2 is a SEM diagram of magnification of 300 times the basic zinc chloride particulate matter prepared in Embodiment 1.
Figure 3:
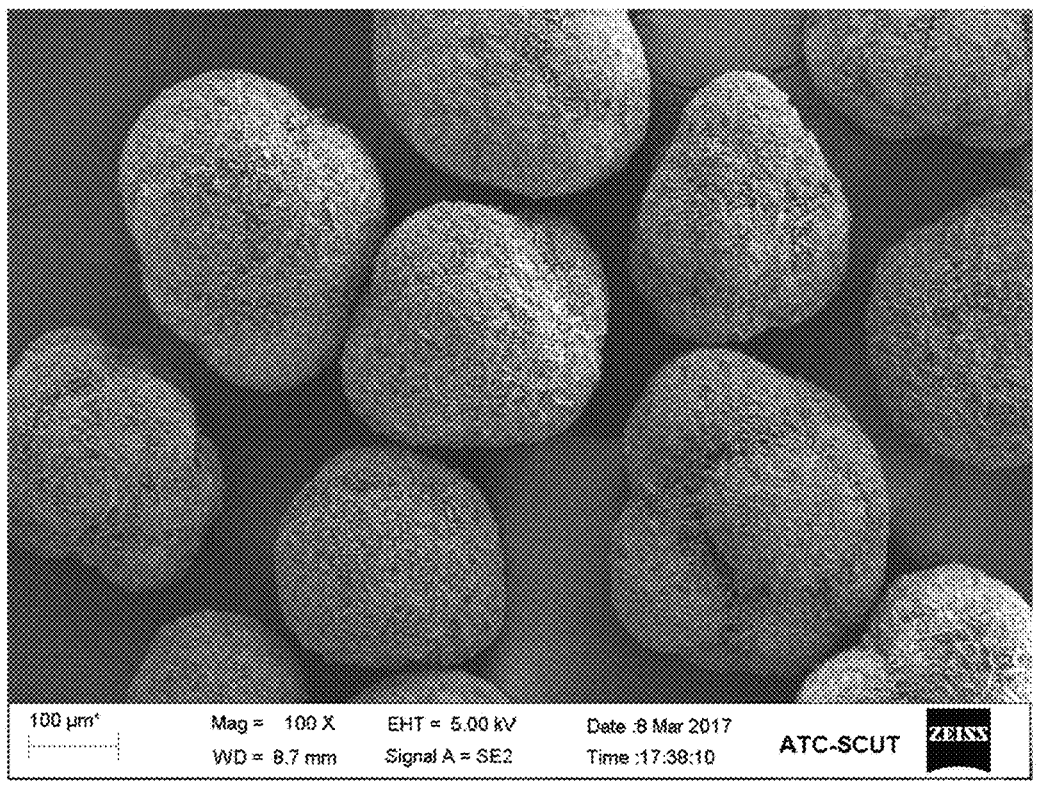
FIG. 3 is a SEM diagram of magnification of 100 times the basic zinc chloride particulate matter prepared in Embodiment 1.
Figure 4:
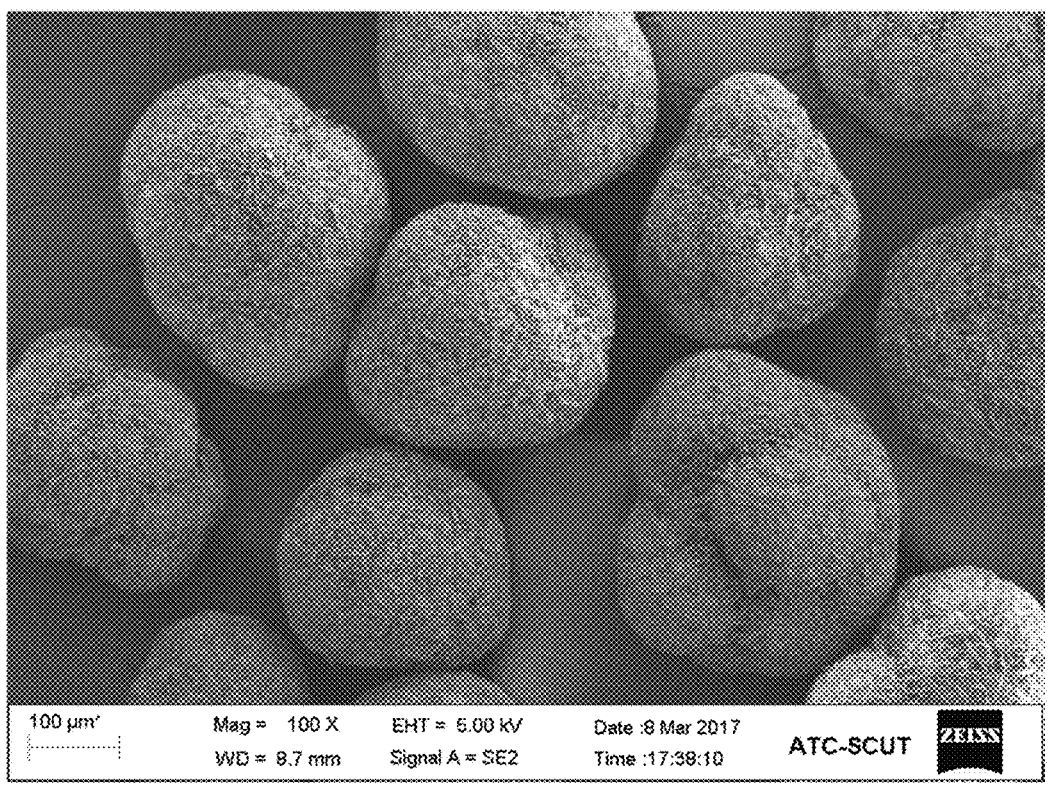
FIG. 4 is a SEM diagram of magnification of 50 times the basic zinc chloride particulate matter prepared in Embodiment 1.
Figure 5:
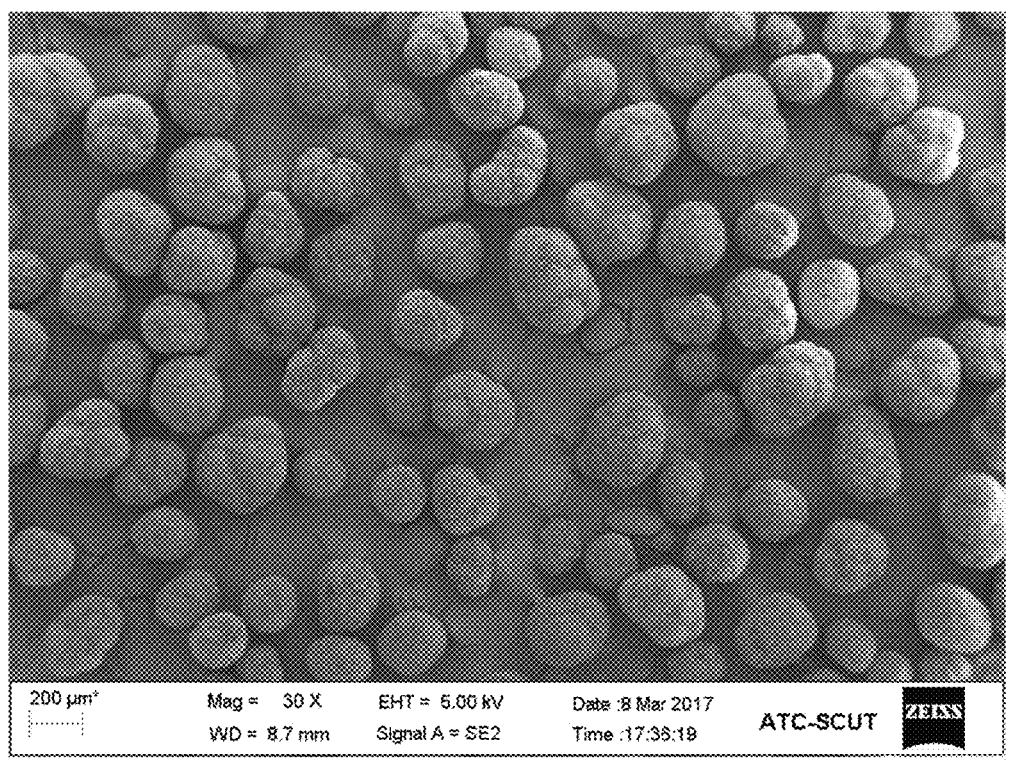
FIG. 5 is a SEM diagram of magnification of 30 times the basic zinc chloride particulate matter prepared in Embodiment 1.
Figure 6:
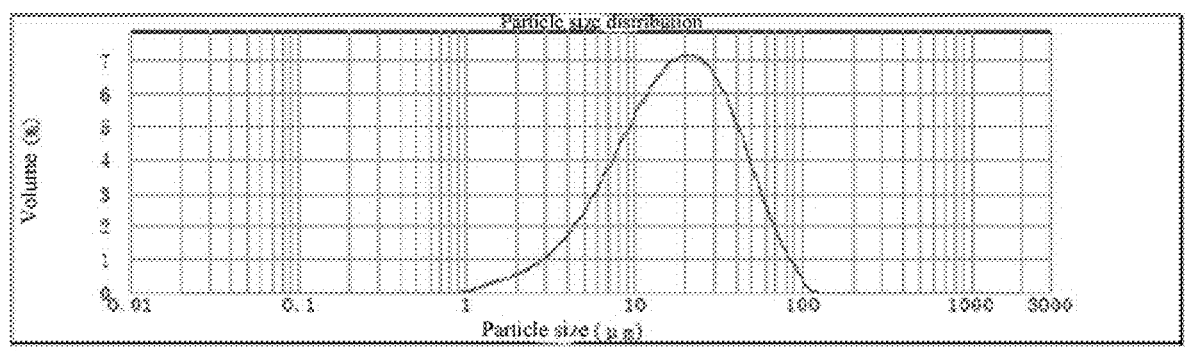
FIG. 6 is a particle size distribution diagram of a commercially available basic zinc chloride product.
Figure 7:
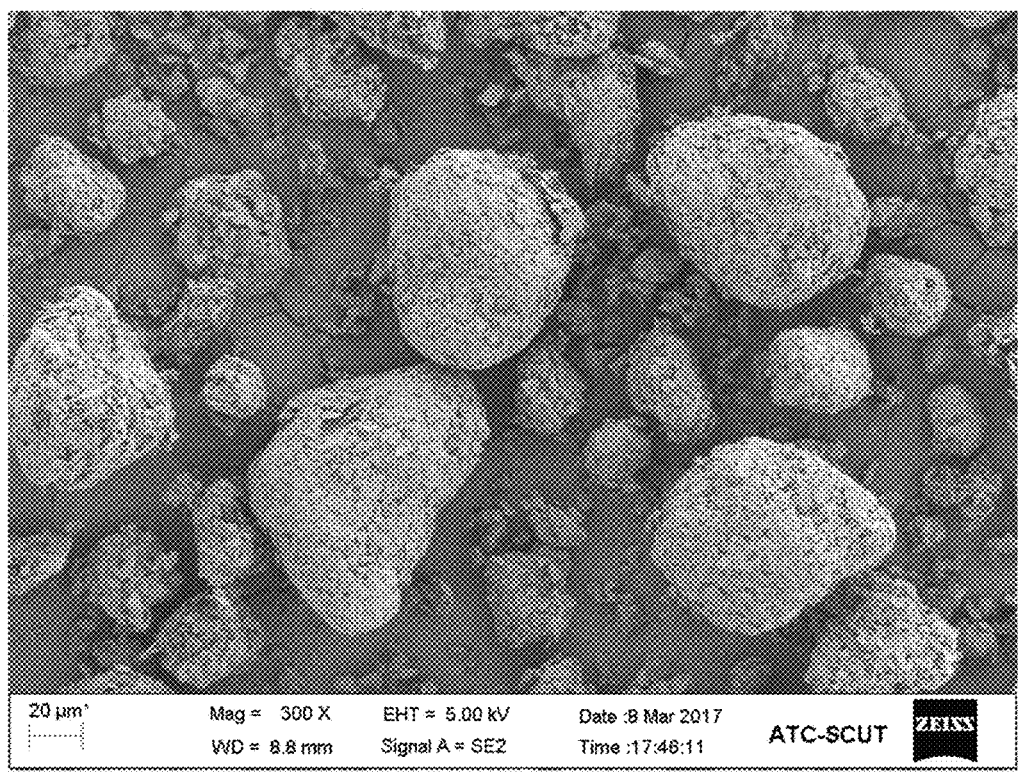
FIG. 7 is a SEM diagram of magnification of 300 times the commercially available basic zinc chloride product.
Figure 8:
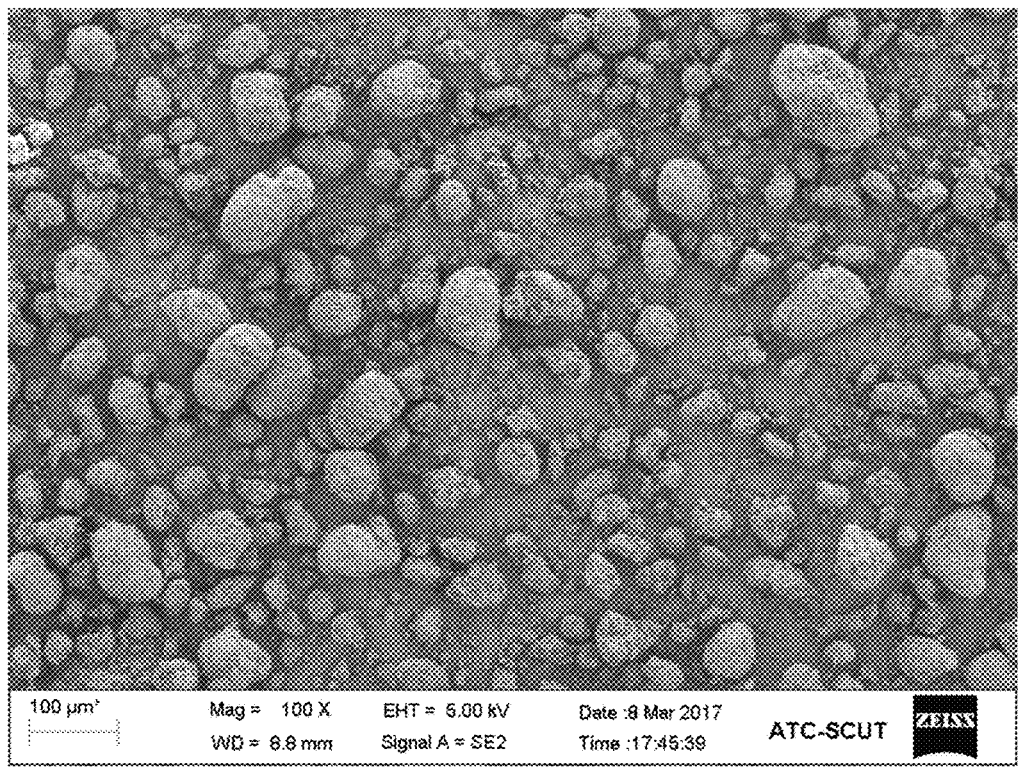
FIG. 8 is a SEM diagram of magnification of 100 times the commercially available basic zinc chloride product.
Figure 9:
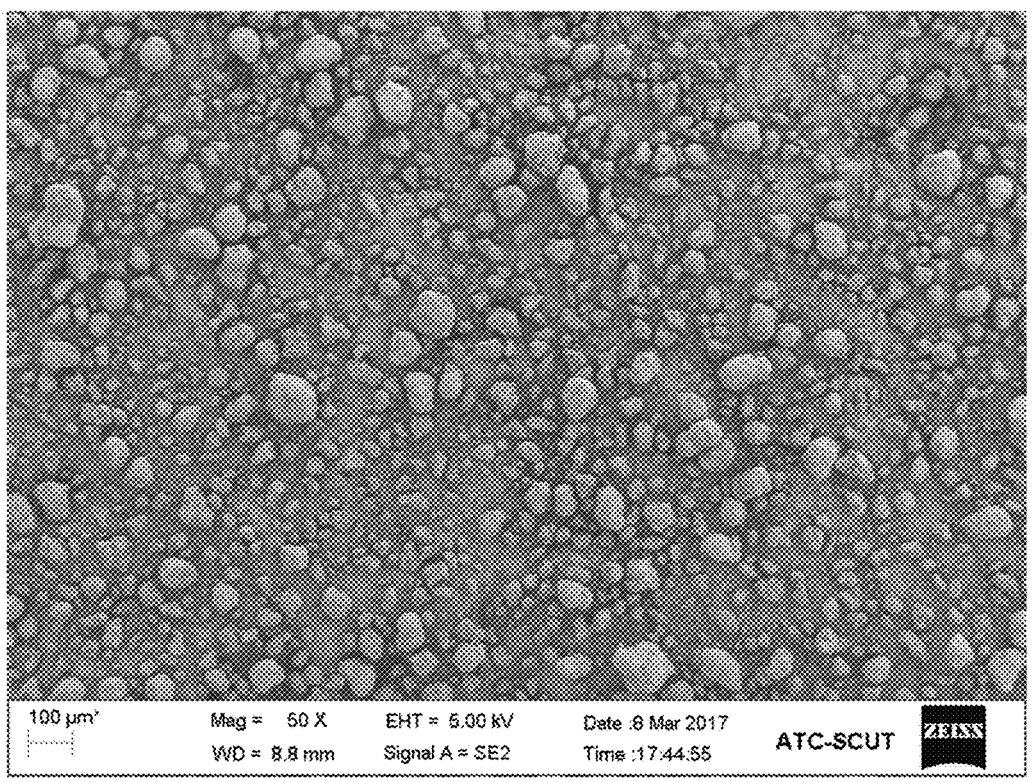
FIG. 9 is a SEM diagram of magnification of 50 times the commercially available basic zinc chloride product.
Figure 10:
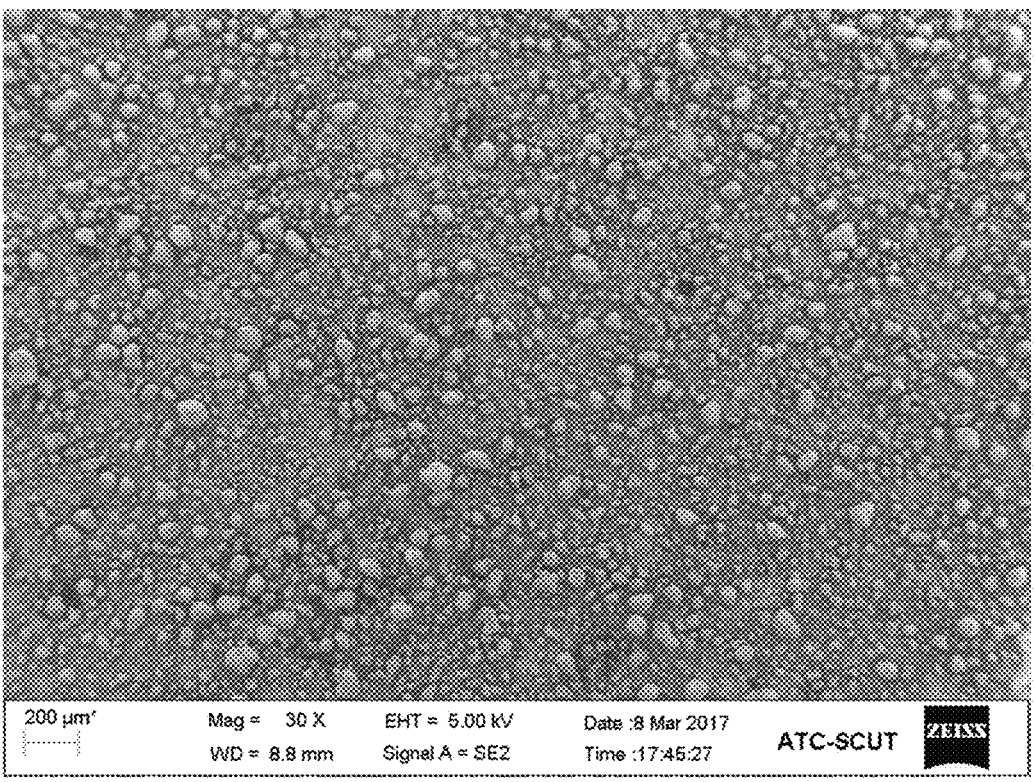
FIG. 10 is a SEM diagram of magnification of 30 times the commercially available basic zinc chloride product.

The present disclosure is further described below in combination with specific implementations, but the present disclosure is not limited by the embodiments in any ways. Unless otherwise, raw materials and reagents used in the embodiments of the present disclosure are conventional raw materials and reagents which are commercially available.

Commercially available basic zinc chloride was purchased from the commercially available product which conforms to Chinese standard Feed Additive—Basic Zinc Chloride (GB/T 22546-2008).

Test method of angle of repose was performed according to Surface active agents—Powders and granules—Measurement of the angle of repose (GB/T 11986-1898).

Particle size distribution, $D_{10}$ and $D_{95}$ were determined by using GB/T19077-2016 Laser Diffraction Methods.

Morphology of the basic zinc chloride was observed by a scanning electron microscope.

Embodiments

A preparation method for the basic zinc chloride particulate matter, includes the following steps: Step S1, zinc oxide was dissolved in a hydrochloric acid solution to prepare a zinc chloride solution;

Step S2, an ammonia solution having a pH of 10 or more was prepared, ammonium chloride was added as an inducer into the ammonia solution to prepare a mixed solution, the ammonium chloride served as a main source of chloride ions in the mixed solution so that the mixed solution had an ammonia-nitrogen concentration of 140 g/L to 170 g/L and a chloride ion concentration of 80 g/L to 160 g/L;

Step S3, zinc oxide was subjected to complexing and ammonia-leaching by using a mixed solution obtained in step S2 to prepare a zinc-ammonia complex solution; and Step S4, water was added into a reaction vessel, followed by heating to 70° C. to 90° C., and the zinc chloride solution in step S1 and the zinc-ammonia complex solution in step S3 were simultaneously added in a parallel feeding manner, a reaction pH value was maintained at 6.0 to 7.0, and the reaction lasted for 2 to 4 hours to obtain a precipitate and a zinc-containing mother solution; and a basic zinc chloride particulate matter in beige or white was obtained by washing and drying the precipitate.

Specific parameters of each embodiment are shown in Table 1.

in the mixed solution so that the mixed solution had an ammonia-nitrogen concentration of 140 g/L to 170 g/L and a chloride ion concentration of 80 g/L to 160 g/L;

Step S3, the zinc-containing flue dust was added to a mixed solution prepared in step S2 for complexing and ammonia-leaching, when a zinc concentration in the liquid phase reached to 60 g/L, filtering separation was performed, ammonia-leaching of the solid phase was continued, zinc powder was added to the liquid phase for replacement and removal of impurities, and a purified zinc-ammonia complex solution was obtained;

Step S4, synthesis of basic zinc chloride water was added into a reaction vessel, followed by heating to 70° C., and the purified zinc chloride solution and the zinc-ammonia complex solution were simultaneously added in a parallel feeding manner, a reaction pH value was maintained at 6.0 to 7.0, and the reaction lasted for 2 hours to obtain a precipitate and a zinc-containing mother solution; and a basic zinc chloride particulate matter was obtained by washing and drying the precipitate; and Step S5, wastewater treatment sodium hydroxide was added to the zinc-containing mother solution for steam stripping, and gaseous phase was subjected to spraying absorption to recycle ammonia water which can be reused in the production or for sale; solid phase obtained by ammonia distillation of liquid phase was the zinc hydroxide solid which can be returned to the front end and dissolved in the hydrochloric acid to prepare the zinc chloride solution for reuse in the production; after the wastewater rid of ammonia-nitrogen was subjected to depth removal of heavy metals, sodium chloride can be recycled by MVR (mechanical vapor recompression) concentration and crystallization, and the evaporated moisture can be reused in production as recycled water after cooling, without discharge of wastewater.

TABLE 1

|  | S1, zinc content in the zinc chloride solution (g/L) | S2, ammonia-nitrogen content in the final solution (g/L) | S2, chloride content in the final solution (g/L) | S3, zinc content in the zinc-ammonia complex solution (g/L) | S4, stirring speed (r/min) | Reaction duration |
|---|---|---|---|---|---|---|
| Embodiment 1 | 60 | 140 | 80 | 60 | 1200 | 2 |
| Embodiment 2 | 150 | 140 | 80 | 60 | 1200 | 2 |
| Embodiment 3 | 60 | 170 | 80 | 110 | 1200 | 2 |
| Embodiment 4 | 60 | 140 | 80 | 60 | 1500 | 2 |
| Embodiment 5 | 110 | 155 | 80 | 110 | 1300 | 4 |
| Embodiment 6 | 110 | 155 | 160 | 110 | 1300 | 4 |
| Embodiment 7 | 110 | 155 | 120 | 110 | 1300 | 4 |

Embodiment 8

Step S1, a zinc-containing flue dust was used as a raw material, by leaching with acid, and removing impurities, a zinc chloride solution was obtained; water was added to the solution to adjust a zinc concentration to 60 g/L, and a purified zinc chloride solution was obtained;

Step S2, an ammonia solution having a pH of 10 or more was prepared, ammonium chloride was added as an inducer into the ammonia solution to prepare a mixed solution, the ammonium chloride served as a main source of chloride ions Comparative Example 1

Basically the same as the above-mentioned Embodiment 1, but a reaction pH value in the synthesis of the basic zinc chloride in step S4 was set as 5.

Comparative Example 2

Basically the same as the above-mentioned Embodiment 1, but a reaction pH value in the synthesis of the basic zinc chloride in step S4 was set as 8.

Comparative Example 3

Basically the same as the above-mentioned Embodiment 1, but a stirring speed in the synthesis of the basic zinc chloride in step S4 was set as 1600 r/min.

Comparative Example 4

Basically the same as the above-mentioned Embodiment 1, but a stirring speed in the synthesis of the basic zinc chloride in step S4 was set as 1100 r/min.

Comparative Example 5

Basically the same as the above-mentioned Embodiment 6, but a chloride ion concentration in the mixed solution obtained in step S2 was 70 g/L.

Comparative Example 6

Basically the same as the above-mentioned Embodiment 6, but a chloride ion concentration in the mixed solution obtained in step S2 was 170 g/L.

The basic zinc chloride particulate matters prepared by each of the embodiments and comparative examples were subjected to the particle size distribution test and flowability test, and the results are as shown in Table 2.

TABLE 2

| | Particle size range of basic zinc chloride (μm) | $D_{10}$ (μm) | $D_{95}$ (μm) | Angle of repose of basic zinc chloride particulate matter (degree) | Morphology | Basic zinc chloride content in particulate matter (%) |
|---|---|---|---|---|---|---|
| Embodiment 1 | 4~900 | 106 | 518 | 30 | Sphere-like white particles | 98.5 |
| Embodiment 2 | 10~880 | 115 | 530 | 32 | Sphere-like white particles | 98.6 |
| Embodiment 3 | 8~850 | 112 | 550 | 35 | Sphere-like white particles | 98.6 |
| Embodiment 4 | 5~890 | 118 | 515 | 33 | Sphere-like white particles | 98.6 |
| Embodiment 5 | 10~810 | 115 | 540 | 35 | Sphere-like white particles | 98.7 |
| Embodiment 6 | 15~750 | 120 | 579 | 35 | Sphere-like white particles | 98.8 |
| Embodiment 7 | 15~690 | 118 | 575 | 35 | Sphere-like white particles | 98.8 |
| Embodiment 8 | 6~800 | 108 | 560 | 31 | Sphere-like white particles | 98.7 |
| Comparative Example 1 | 1~80 | 45 | 78 | 58 | White powder | 96.7 |
| Comparative Example 2 | 1~90 | 55 | 85 | 65 | White powder | 97.5 |
| Comparative Example 3 | 1~105 | 62 | 100 | 55 | White powder | 96.1 |
| Comparative Example 4 | 1~300 | 83 | 288 | 48 | White solid | 97.5 |
| Comparative Example 5 | 1~120 | 44 | 115 | 52 | White powder | 96.2 |
| Comparative Example 6 | 1~180 | 52 | 160 | 50 | White powder | 97.1 |
| Commercially available basic zinc chloride particulate matter | 1~110 | 20 | 100 | 55~60 | Beige powder | 98.1 |

It can be seen from the data of the above-mentioned embodiments and comparative examples that the pH value, the chloride ion content in the ammonia solution and the stirring speed exert a significant effect on the prepared basic zinc chloride particles. The basic zinc chloride particles prepared within the pH value range of the present disclosure have a sphere-like shape, an angle of repose of 30° to 35°, and excellent flowability, which are conducive to storage and uniform mixing of the premix. The basic zinc chloride particles have a $D_{10}$ of more than 100 μm and a $D_{95}$ of more than 450 μm, indicating that most of them are particles with relatively large particle size, and the particle size is uniform. They are more convenient in use, compared with the commercially available basic zinc chloride product of which the particle size is too small and uneven. It can be seen from the comparative examples that particles with large particle size may also be obtained (for example, Comparative Example 4) even though the preparation process is out of the scope of the present disclosure, but such product still has bad flowability performance and is difficult to be dispersed.

The basic zinc chloride particulate matters prepared by Embodiments 1 to 8 were sieved through a 35-mesh sieve, particles which can pass through the 35-mesh sieve were collected, and $D_{10}$ and $D_{95}$ thereof were measured. Results are as shown in Table 3.

TABLE 3

| | Mass before sieving (g) | Mass after sieving (g) | Particle size range of basic zinc chloride after sieving (μm) | $D_{10}$ (μm) | $D_{95}$ (μm) | Angle of repose of basic zinc chloride particulate matter (degree) | Morphology | Basic zinc chloride content in particulate matter (%) |
|---|---|---|---|---|---|---|---|---|
| Embodiment 1 | 200 | 198.9 | 4~450 | 115 | 488 | 30 | Sphere-like white particles | 98.8 |
| Embodiment 2 | 200 | 199.3 | 10~450 | 115 | 510 | 30 | Sphere-like white particles | 98.6 |
| Embodiment 3 | 200 | 199.4 | 8~450 | 110 | 550 | 35 | Sphere-like white particles | 98.6 |
| Embodiment 4 | 200 | 199.1 | 5~450 | 120 | 485 | 30 | Sphere-like white particles | 98.6 |
| Embodiment 5 | 200 | 198.4 | 10~450 | 125 | 510 | 35 | Sphere-like white particles | 98.7 |
| Embodiment 6 | 200 | 198.8 | 15~450 | 110 | 479 | 35 | Sphere-like white particles | 98.1 |
| Embodiment 7 | 200 | 198.7 | 15~450 | 108 | 475 | 35 | Sphere-like white particles | 98.2 |
| Embodiment 8 | 200 | 198.5 | 6~450 | 117 | 480 | 35 | Sphere-like white particles | 98.7 |

What is claimed is:

1. A basic zinc chloride particulate matter, wherein the basic zinc chloride particulate matter includes basic zinc chloride particles; the basic zinc chloride particulate matter has a $D_{10}$ of more than 100 μm and a $D_{95}$ of more than 450 μm; the basic zinc chloride particles are free of adhesives; most of the basic zinc chloride particles contained in the basic zinc chloride particulate matter have a sphere-like appearance, and the basic zinc chloride particles having a particle size of more than 500 μm in the basic zinc chloride particulate matter account for 1% or less of a total mass of the basic zinc chloride particulate matter.

2. The basic zinc chloride particulate matter according to claim 1, wherein the basic zinc chloride particulate matter has a particle size distribution range of 1 μm to 1000 μm.

3. The basic zinc chloride particulate matter according to claim 2, wherein the particles having the sphere-like appearance in the basic zinc chloride particulate matter account for 95% or more of the total mass of the particulate matter.

4. A feed additive, wherein the feed additive comprises the basic zinc chloride particulate matter according to claim 3.

5. A feed additive, wherein the feed additive comprises the basic zinc chloride particulate matter according to claim 2.

6. The basic zinc chloride particulate matter according to claim 1, wherein the particles having the sphere-like appearance in the basic zinc chloride particulate matter account for 95% or more of the total mass of the particulate matter.

7. A feed additive, wherein the feed additive comprises the basic zinc chloride particulate matter according to claim 6.

8. A feed additive, wherein the feed additive comprises the basic zinc chloride particulate matter according to claim 1.

9. A preparation method for the basic zinc chloride particulate matter according to claim 1, wherein the preparation method comprises the following steps:

step S1, preparing a zinc chloride solution having a zinc concentration of 60 g/L to 150 g/L;

step S2, preparing an ammonia solution having a pH of 10 or more, adding ammonium chloride as an inducer into the ammonia solution to prepare a mixed solution, with the ammonium chloride serving as a main source of chloride ions in the mixed solution, so that the mixed solution has an ammonia-nitrogen concentration of 140 g/L to 170 g/L and a chloride ion concentration of 80 g/L to 160 g/L;

step S3, complexing and ammonia-leaching of a zinc-containing raw material by using a mixed solution obtained in step S2 to prepare a zinc-ammonia complex solution, with a zinc concentration in the zinc-ammonia complex solution being 60 g/L to 150 g/L; and step S4, adding water or a mother solution of the basic zinc chloride into a reaction vessel, heating to 70° C. to 90° C., and adding the zinc chloride solution in step S1 and the zinc-ammonia complex solution in step S3 simultaneously in a parallel feeding manner, maintaining a reaction pH value at 6.0 to 7.0, with a stirring speed of 1200 r/min to 1500 r/min, and reacting for 2 to 4 hours to obtain a precipitate and a zinc-containing mother solution, and washing and drying the precipitate to obtain the basic zinc chloride particulate matter.

10. The preparation method for the basic zinc chloride particulate matter according to claim 9, wherein the preparation method further comprises a step of sieving the dried precipitate after completing step S4 to remove the particles having relatively large particle size.

11. The preparation method for the basic zinc chloride particulate matter according to claim 10, wherein the zinc-containing mother solution in step S4 is subjected to alkali stripping and spraying absorption to recycle ammonia water.

12. The preparation method for the basic zinc chloride particulate matter according to claim 11, wherein after removing the ammonia-nitrogen by the alkali stripping, the zinc-containing mother solution in step S4 is subjected to depth removal of heavy metals, concentration and crystallization to recycle sodium chloride.

13. The preparation method for the basic zinc chloride particulate matter according to claim 10, wherein the zinc chloride solution in step S1 is prepared by the following method:

using a zinc-containing flue dust as a raw material, leaching with acid, and removing impurities to obtain the zinc chloride solution.

14. The preparation method for the basic zinc chloride particulate matter according to claim 10, wherein the zinc-containing raw material is a zinc-containing flue dust, and when using the zinc-containing flue dust as the raw material, the obtained zinc-ammonia complex solution is further subjected to a step of adding zinc powder for replacement and removal of impurities.

15. The preparation method for the basic zinc chloride particulate matter according to claim 9, wherein the zinc-containing mother solution in step S4 is subjected to alkali stripping and spraying absorption to recycle ammonia water.

16. The preparation method for the basic zinc chloride particulate matter according to claim 15, wherein after removing the ammonia-nitrogen by the alkali stripping, the zinc-containing mother solution in step S4 is subjected to depth removal of heavy metals, concentration and crystallization to recycle sodium chloride.

17. The preparation method for the basic zinc chloride particulate matter according to claim 9, wherein the zinc chloride solution in step S1 is prepared by the following method:

using a zinc-containing flue dust as a raw material, leaching with acid, and removing impurities to obtain the zinc chloride solution.

18. The preparation method for the basic zinc chloride particulate matter according to claim 9, wherein the zinc-containing raw material is a zinc-containing flue dust, and when using the zinc-containing flue dust as the raw material, the obtained zinc-ammonia complex solution is further subjected to a step of adding zinc powder for replacement and removal of impurities.

\* \* \* \* \*